(12) United States Patent
Li et al.

(10) Patent No.: US 8,918,837 B2
(45) Date of Patent: Dec. 23, 2014

(54) WEB APPLICATION CONTAINER FOR CLIENT-LEVEL RUNTIME CONTROL

(71) Applicant: Intel Corporation, Santa Clara, CA (US)

(72) Inventors: Hong Li, El Dorado Hills, CA (US); Prashant Dewan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/729,605

(22) Filed: Dec. 28, 2012

(65) Prior Publication Data

US 2014/0189778 A1 Jul. 3, 2014

(51) Int. Cl.
*G06F 17/00* (2006.01)
*H04L 29/06* (2006.01)

(52) U.S. Cl.
CPC .................................. *H04L 63/20* (2013.01)
USPC ............................................................ 726/1

(58) Field of Classification Search
USPC ............................................................ 726/1
See application file for complete search history.

(56) References Cited

U.S. PATENT DOCUMENTS

| | | | |
|---|---|---|---|
| 8,230,088 B2* | 7/2012 | Herman et al. ............... | 709/229 |
| 8,392,973 B2* | 3/2013 | Bank et al. ........................ | 726/5 |
| 8,566,901 B2* | 10/2013 | Kay et al. ........................... | 726/1 |
| 2003/0177248 A1* | 9/2003 | Brown et al. ................. | 709/229 |
| 2008/0010683 A1 | 1/2008 | Baddour et al. | |
| 2008/0104699 A1 | 5/2008 | Gounares et al. | |
| 2008/0222238 A1 | 9/2008 | Ivanov et al. | |
| 2009/0070873 A1 | 3/2009 | McAfee et al. | |
| 2009/0249489 A1 | 10/2009 | Livshits et al. | |
| 2010/0169974 A1 | 7/2010 | Calendino et al. | |
| 2010/0235885 A1* | 9/2010 | Persson et al. .................... | 726/4 |
| 2010/0332837 A1 | 12/2010 | Osterwalder | |
| 2011/0145926 A1 | 6/2011 | Dalcher et al. | |
| 2011/0167474 A1 | 7/2011 | Sinha et al. | |
| 2011/0317211 A1 | 12/2011 | Yamada et al. | |
| 2012/0110174 A1 | 5/2012 | Wootton et al. | |
| 2012/0192280 A1 | 7/2012 | Venkatakrishnan et al. | |
| 2012/0216133 A1 | 8/2012 | Barker et al. | |
| 2013/0055387 A1 | 2/2013 | Kim et al. | |
| 2014/0006711 A1 | 1/2014 | Xing | |

FOREIGN PATENT DOCUMENTS

JP 2010157211 A 7/2010

OTHER PUBLICATIONS

Web container, Wikipedia, The Free Encyclopedia, retrieved from: <http://en.wikipedia.org/w/index.php?title=Web_container&oldid=484851882>, edited Mar. 31, 2012, 2 pages.
Code signing, Wikipedia, The Free Encyclopedia, retrieved from: <http://en.wikipedia.org/w/index.php?title=Code_signing&oldid=483061773>, edited Mar. 21, 2012, 3 pages.

(Continued)

*Primary Examiner* — Teshome Hailu
(74) *Attorney, Agent, or Firm* — Barnes & Thornburg LLP (Intel)

(57) ABSTRACT

Technologies for establishing client-level web application runtime control using a computing device include receiving application code for a browser-based application from a web server and generating machine-executable code and an access control map for the application code. The computing device receives application security information associated with the application code from local and/or remote security applications and performs a security assessment of the application code based on the application security information and the access control map. Further, the computing device establishes a runtime security policy for the browser-based application and enforces that policy.

21 Claims, 5 Drawing Sheets

(56) References Cited

OTHER PUBLICATIONS

U.S. Appl. No. 13/628,219, filed Sep. 27, 2012, 23 pages.
U.S. Appl. No. 13/628,221, filed Sep. 27, 2012, 27 pages.
U.S. Appl. No. 13/628,502, filed Sep. 27, 2012, 22 pages.
U.S. Appl. No. 13/631,283, filed Sep. 28, 2012, 37 pages.
U.S. Appl. No. 13/671,690, filed Nov. 8, 2012, 13 pages.
U.S. Appl. No. 13/721,912, filed Dec. 20, 2012, 31 pages.
International Search Report and Written Opinion received for International Application No. PCT/US2013/077567, mailed Apr. 1, 2014, 9 pages.

* cited by examiner

WEB APPLICATION CONTAINER FOR CLIENT-LEVEL RUNTIME CONTROL

BACKGROUND

Access controls may be imposed on Hypertext Markup Language 5 (HTML 5) applications and other browser-based applications at various stages. For example, developers of browser-based applications may configure access controls at design time for security and other related purposes. Additionally, in some circumstances, users are able to establish further access controls for browser-based applications at application launch time. With many browser-based applications, users can configure passwords, identifiers (IDs), and allow or disallow the execution of certain application code using a web browser when a browser-based application is launched and/or based on static security settings.

Application containers are used to execute applications on computing devices in a secure environment. Existing application containers permit users to apply filters and access controls to device attributes. However, those application containers are configured at design time and, therefore, the ability to configure the security features of the application containers at run-time is limited.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
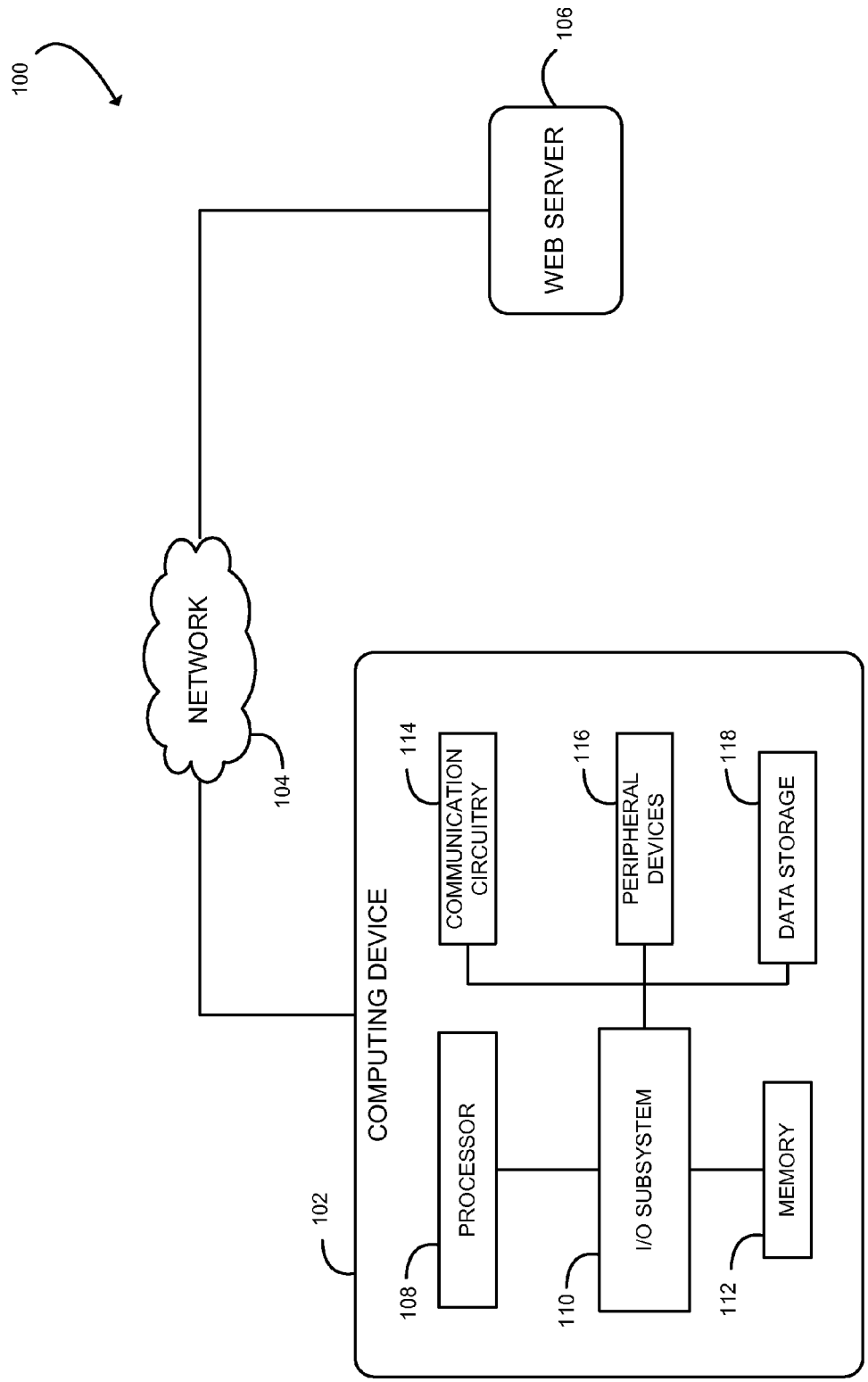
FIG. 1 is a simplified block diagram of at least one embodiment of a system for establishing client-level web application runtime control using a computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for establishing client-level web application runtime control includes a computing device 102, a network 104, and a web server 106. In use, as discussed in more detail below, the computing device 102 may receive a browser-based application from the web server 106 and establish and enforce runtime access controls for the received browser-based application. Although only one computing device 102, one network 104, and one web server 106 are illustratively shown in FIG. 1, the system 100 may include any number of computing devices 102, networks 104, and web servers 106. For example, a user of the computing device 102 may access several browser-based applications. As such, the computing device 102 may receive the browser-based applications over multiple networks 104 from several different web servers 106.

The computing device 102 may be embodied as any type of computing device capable of establishing a communication link with the web server 106 and performing the functions described herein. For example, the computing device 102 may be embodied as a cellular phone, smartphone, tablet computer, laptop computer, personal digital assistant, mobile Internet device, desktop computer, server, and/or any other computing/communication device. As shown in FIG. 1, the illustrative computing device 102 includes a processor 108, an input/output ("I/O") subsystem 110, a memory 112, a communication circuitry 114, one or more peripheral devices 116, and a data storage 118. Of course, the computing device 102 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 112, or portions thereof, may be incorporated in the processor 108 in some embodiments.

The processor 108 may be embodied as any type of processor capable of performing the functions described herein. For example, the processor may be embodied as a single or multi-core processor(s), digital signal processor, microcontroller, or other processor or processing/controlling circuit. Similarly, the memory 112 may be embodied as any type of volatile or non-volatile memory or data storage capable of performing the functions described herein. In operation, the memory 112 may store various data and software used during operation of the computing device 102 such as operating systems, applications, programs, libraries, and drivers. The memory 112 is communicatively coupled to the processor 108 via the I/O subsystem 110, which may be embodied as circuitry and/or components to facilitate input/output operations with the processor 108, the memory 112, and other components of the computing device 102. For example, the I/O subsystem 110 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 110 may form a portion of a system-on-a-chip (SoC) and be incorporated, along with the processor 108, the memory 112, and other components of the computing device 102, on a single integrated circuit chip.

The communication circuitry 114 of the computing device 102 may be embodied as any communication circuit, device, or collection thereof, capable of enabling communications between the computing device 102 and other remote devices (e.g., the web server 106) over the network 104. The communication circuitry 114 may be configured to use any one or more communication technology (e.g., wireless or wired communications) and associated protocols to effect such communication.

The peripheral devices 116 of the computing device 102 may include any number of additional peripheral or interface devices. The particular devices included in the peripheral devices 116 may depend on, for example, the intended use of the computing device 102. The data storage 118 may be embodied as any type of device or devices configured for short-term or long-term storage of data such as, for example, memory devices and circuits, memory cards, hard disk drives, solid-state drives, or other data storage devices.

The network 104 may be embodied as any number of various wired and/or wireless telecommunication networks. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), or any combination thereof.

The web server 106 may be embodied as any type of computing device server capable of performing the functions described herein. For example, in some embodiments, the web server 106 may be similar to the computing device 102 as described above. That is, the web server 106 may be embodied as an enterprise-level server computer, a desktop computer, a laptop computer, a tablet computer, a cellular phone, smartphone, personal digital assistant, mobile Internet device, and/or any other computing/communication device. Further, the web server 106 may include components similar to those of the computing device 102 discussed above. The description of those components of the computing device 102 is equally applicable to the description of components of the web server 106 and is not repeated herein for clarity of the description. Further, it should be appreciated that the web server 106 may include other components, sub-components, and devices commonly found in a computing device or server, which are not discussed above in reference to the computing device 102 and not discussed herein for clarity of the description.

As discussed in greater detail below, the system 100 allows the computing device 102 to more securely execute browser-based applications such as HTML 5 applications. For example, the system 100 allows the computing device 102 to disable, or otherwise control, certain HTML 5 features based on established runtime security policies. Further, in addition to access controls applied at design time by the developer and at application launch time by the user, the system 100 permits the computing device 102 to establish runtime access controls as discussed in more detail below.

Figure 2:
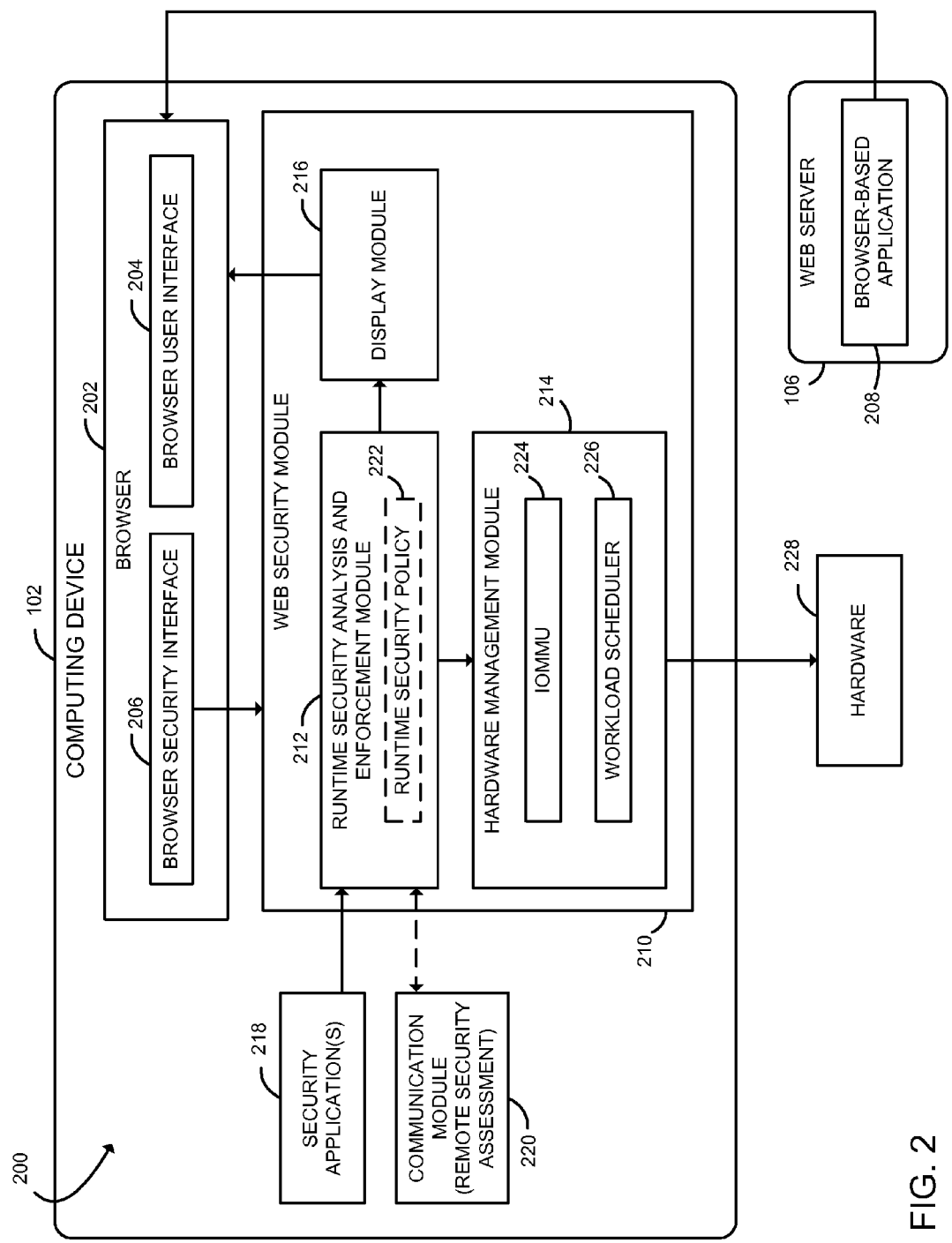
FIG. 2 is a simplified block diagram of at least one embodiment of an environment of a computing device of the system of FIG. 1.

Referring now to FIG. 2, in use, the computing device 102 establishes an environment 200 for facilitating client-level web application runtime control. The environment 200 in the illustrative embodiment includes a browser 202, a web security module 210, one or more security applications 218, and a communication module 220, each of which may be embodied as software, firmware, hardware, or a combination thereof. Further, the browser 202 may include a browser user interface 204 and a browser security interface 206.

The browser 202 may be embodied as any type of web browser or similar application capable of retrieving a browser-based application 208 from the web server 106 and presenting the browser-based application 208 to the user on the computing device 102. In doing so, the browser 202 may, for example, utilize Uniform Resource Identifiers (URIs). In various embodiments, the browser 202 may be embodied as, for example, an Internet Explorer browser, which is commercially available from Microsoft Corp. of Redmond, Wash.; a Firefox browser, which is commercially available from Mozilla Corp. of Mountain View, Calif., a Safari browser, which commercially available from Apple Inc. of Cupertino, Calif., a Chrome browser, which is commercially available from Google, Inc. of Mountain View Calif.; an Opera browser, which is commercially available from Opera Software ASA of Oslo, Norway; an Android-based browser, or other web browser or the like.

The browser user interface 204 allows the user of the computing device 102 to interact passively and/or actively with the browser-based application 208. That is, the browser user interface 204 permits user input and/or output to the user. For example, the browser user interface 204 may display the browser-based application 208 on a peripheral device 116 (e.g., a display) of the computing device 102. Additionally, the browser user interface 204 may receive user-entered input (e.g., user configurations).

The browser security interface acts as an interface between the browser 202 and the web security module 210. The browser security interface 206 intercepts the application code for the browser-based application 208 and captures user access control configurations when the browser-based application 208 is launched (i.e., at launch time). Further, as discussed in detail below, the browser security interface 206 generates machine-executable code and an access control map for the application code associated with the browser-based application 208. In some embodiments, the browser security interface 206 generates the access control map based on design time rules established by the developer and user configurations.

In the illustrative embodiment, the web security module 210 includes a runtime security analysis and enforcement module 212, a hardware management module 214, and a display module 216. As discussed below, the web security module 210 establishes and enforces a client-level web application runtime security policy and monitors hardware access attempts by the browser-based application. In some embodiments, the web security module 210 may include a secure web application container. That is, the web security module 210 may be embodied as, for example, a sandbox or application control container for separating programs that are executing. Although the web security module 210 is shown as a static module in the illustrative embodiment of FIG. 2, in other embodiments, the web security module 210 and/or another secure web application container may be generated in response to the launching of the browser-based application 208.

The runtime security analysis and enforcement module 212 assesses the security of the browser-based application 208 and establishes a runtime security policy 222 based on such assessment. That is, the runtime security analysis and enforcement module 212 receives application security information from other security applications 218, perform a security assessment of the browser-based application 208, and establish and enforce a client-level web application runtime security policy ("application runtime security policy" or "runtime security policy") 222 associated with the browser-based application 208. In some embodiments, the runtime security analysis and enforcement module 212 receives or collects real-time security monitoring data from other local security applications such as malware detection, prevention, and/or removal applications (e.g., those security applications commercially available from McAfee, Inc. of Santa Clara, Calif.) as it pertains to the browser-based application 208 to be executed. Additionally or alternatively, the communication module 220 may receive a security assessment of the browser-based application 208 from a remote computing device. For example, the communication module 220 may transmit the application code or machine-executable code of the browser-based application 208 to a remote anti-malware system for analysis (e.g., a cloud-based anti-virus system or a remote anti-virus service in an enterprise environment). Alternatively or in addition, the communication module 220 may receive a remote security assessment of the browser-based application 208 from another computing device's web security module or runtime security analysis and enforcement module (i.e., from another computing device similar to computing device 102). In such embodiments, the communication module 220 may provide the remote security assessment to the runtime security analysis and enforcement module 212 for further use.

As discussed in further detail below, in some embodiments, the runtime security analysis and enforcement module 212 performs a security assessment of the browser-based application 208 as a function of the application security information received from the security applications 218 and/or remote devices and the access control map generated by the browser security interface 206. Additionally, the runtime security analysis and enforcement module 212 establishes a runtime security policy 222 for the browser-based application 208, which may include various hardware access rules and/or mediation security rules. In some embodiments, the runtime security analysis and enforcement module 212 monitors hardware access attempts by the browser-based application 208 and interfaces with the hardware management module 214 to restrict access to certain hardware 228 of the computing device 102. It should be appreciated that although the runtime security analysis and enforcement module 212 is shown in FIG. 2 as a single module, in other embodiments, the functions of the runtime security analysis and enforcement module 212 may be shared by multiple modules. For example, in one embodiment, the web security module 210 may include a runtime security analysis module to perform the security analysis functions of the runtime security analysis and enforcement module 212 and a separate enforcement module to perform the enforcement functions.

The hardware management module 214 includes an input/output memory management unit (IOMMU) 224 and a workload scheduler 226. The hardware management module 214 works with the runtime security analysis and enforcement module 212 to enforce hardware access rules established in the runtime security policy 222. For example, the runtime security policy 222 may require that a critical section of the memory 112 of the computing device 102 be inaccessible to the browser-based application 208. In such an embodiment, the runtime security analysis and enforcement module 212 monitors access attempts to that section of the memory 112 by the browser-based application 208 and permits only secure access attempts (e.g., only permits secure application code to be sent to the hardware 228 for execution). The runtime security analysis and enforcement module 212 instructs the hardware management module 214 (e.g., via transmitted instructions) to deny unsecure and/or unauthorized accesses to the hardware 228 using the input/output memory management unit 224. Similarly, the workload scheduler 226 of the hardware management module 214 restricts accesses to other hardware components of the computing device 102 (e.g., the processor 108, etc.) and enforces the amount of time a particular workload may execute before it must be aborted in accordance with the runtime security policy 222.

The display module 216 interfaces between the runtime security analysis and enforcement module 212 and the browser user interface 204 to provide the user of the computing device 102 with information regarding the security of the browser-based application 208. That is, the display module 216 provides data to the browser-user interface 204 for display on the browser 202 of the computing device 102. In some embodiments, the display module 216 permits the user to view security assessment results, alerts, notifications, recommendations, and/or other information from the runtime security analysis and enforcement module 212 or the web security module 210. Additionally, the communication module 220 handles the communication between the computing device 102 and remote devices (e.g., the web server 106) through the network 104.

Of course, it should be appreciated that each of the browser 202, the browser user interface 204, the browser security interface 206, the web security module 210, the runtime security analysis and enforcement module 212, the hardware management module 214, the display module 216, the security applications 218, the communication module 220, the input/output memory management unit (IOMMU) 224, and the workload scheduler 226 may be embodied as hardware, software, firmware, or a combination thereof.

Figure 3:
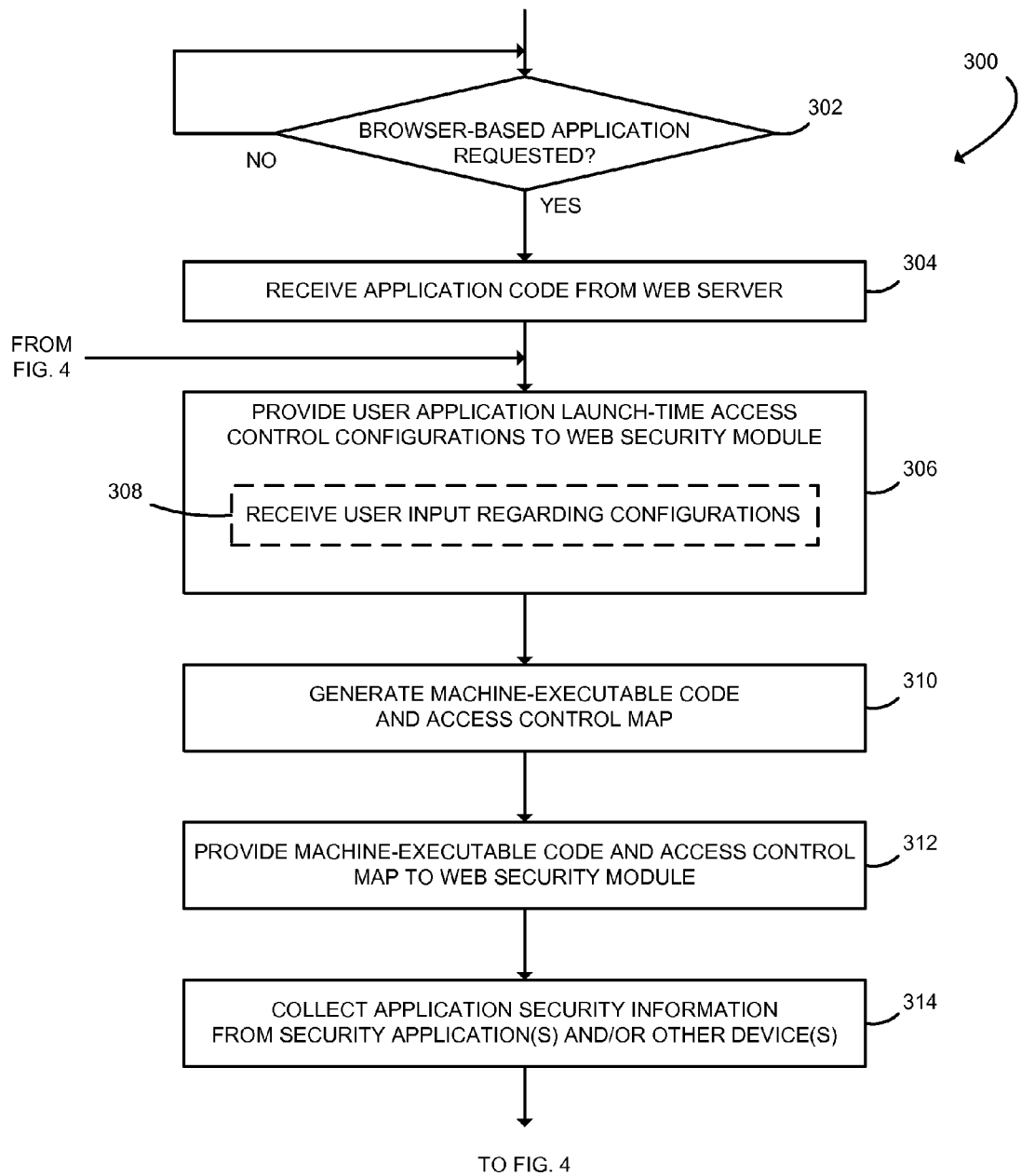
FIGS. 3 and 4 are simplified flow diagrams of at least one embodiment of a method for establishing client-level web application runtime control using a computing device of the system of FIG. 1.

Referring now to FIG. 3, in use, the computing device 102 may execute a method 300 for establishing client-level web application runtime control. The method 300 begins with block 302 in which the computing device 102 determines whether the computing device 102 has requested a browser-based application 208 from a web server 106. Of course, such a request may occur, for example, when a user of the computing device 102 navigates to a webpage while browsing the Internet or other network. If the computing device 102 has requested the browser-based application 208, the computing device 102 receives (e.g., by downloading) the application code associated with the browser-based application 208 from the web server in block 304. It should be appreciated that some browser-based applications 208 are dynamic, streamed, or otherwise received over time. In such embodiments, the method 300 may be executed for each block, packet, or section of application code transmitted within a certain amount of time. For example, in an embodiment involving streamed application code, the browser security interface 206 may act as a buffer and, at any given point in time, provide a currently buffered segment of machine-executable application code to the web security module 210 for analysis.

In block 306, the computing device 102 provides user application launch-time access control configurations to the web security module 210 (e.g., via the browser security interface 206). As discussed above, in some embodiments, a user can allow or disallow certain application code from being executed using the browser 202 by establishing user application launch-time access control configurations. In doing so, the user may establish static security settings for one or more browser-based applications 208 (e.g., via browser security settings). Alternatively or additionally, the user may establish user application launch-time access control configurations in response to the browser-based application 208 being launched. As such, in block 308, the computing device 102 may receive user input regarding the access control configurations. Further, the computing device 102 may retrieve any static launch-time access control configurations from the data storage 118 or memory 112 of the computing device 102 or from one or more remote devices (e.g., in a cloud environment).

In block 310, the computing device 102 generates machine-executable code and an access control map for the browser-based application 208 (e.g., using the browser security interface 206). In various embodiments, the generated machine-executable code may be bytecode, machine code, binary code, interpreted code, and/or any other suitable code. Further, in other embodiments, the computing device 102 may request a remote device to generate the machine-executable code. As discussed above, the access control map may be generated as a function of the design time rules and the user configurations (i.e., launch time rules) of the browser-based application 208. For example, the developer may establish access control at design time by specifying which hardware 228 of the computing device 102 is to be accessed (e.g., by writing to and reading from particular ports). Additionally, the user configurations may prohibit the browser-based application 208 from accessing certain hardware 228 (e.g., particular memory locations). As such, in some embodiments, the access control map defines or otherwise identifies which hardware 228 of the computing device 102 the browser-based application 208 is configured to access without runtime access controls yet imposed.

In block 312, the browser security interface 206 of the computing device 102 provides the generated machine-executable code and access control map to the web security module 210. In some embodiments, the runtime security analysis and enforcement module 212 of the web security module 210 collects or receives application security information from one or more security applications 218 and/or other remote devices. As discussed above, the application security information may be a security assessment of the browser-based application 208 by, for example, a malware detection application. Further, in some embodiments, the computing device 102 may transmit the machine-executable code or the application code to a remote device for security analysis if applicable. After any available security information is collected in block 314, the method 300 advances to block 316 (see FIG. 4).

Figure 4:
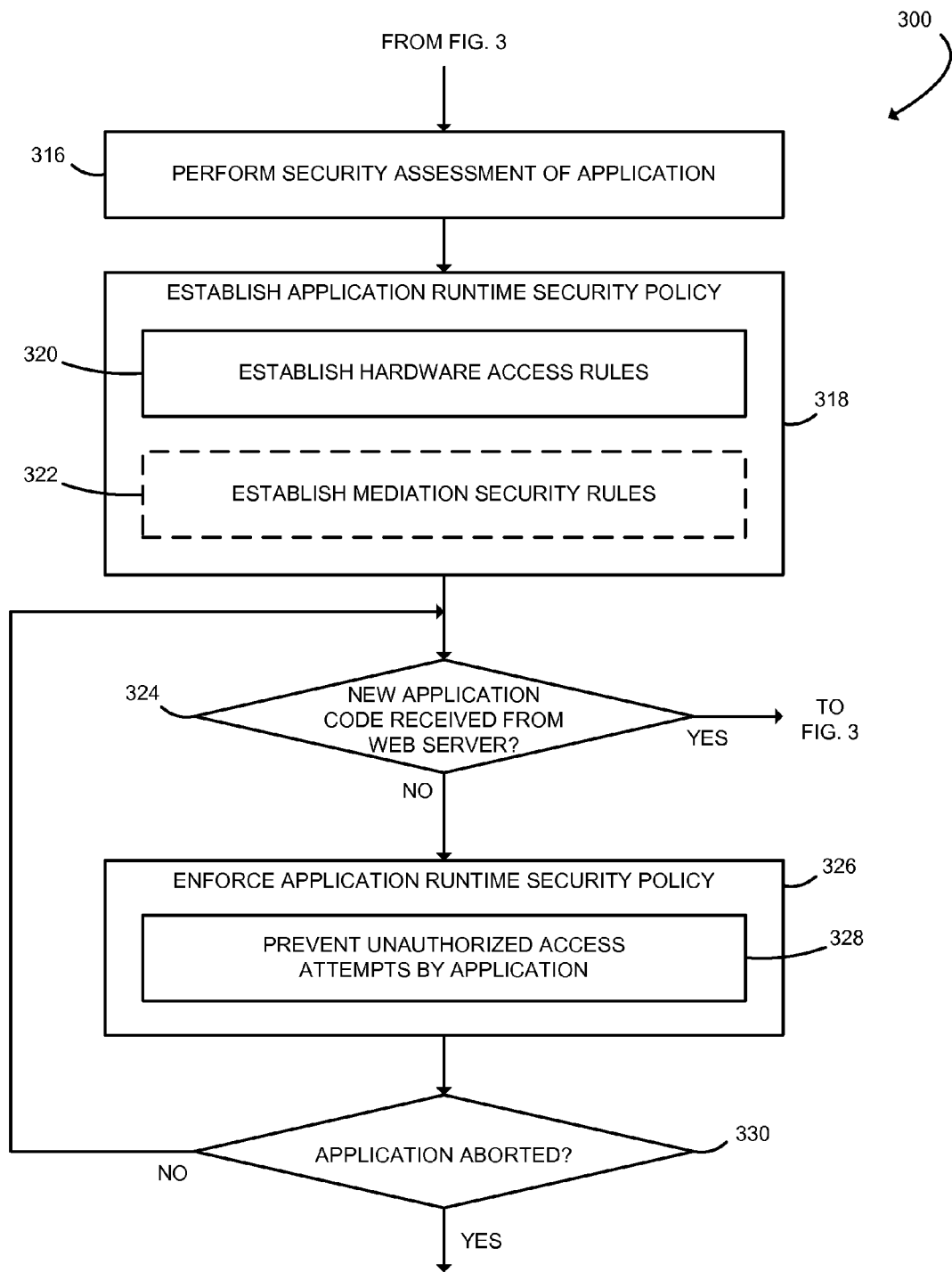

In block 316 of FIG. 4, the runtime security analysis and enforcement module 212 performs a security assessment of the browser-based application 208. That is, in an embodiment, the runtime security analysis and enforcement module 212 may analyze the application security information received from the security applications 218 and/or web security modules of other devices to determine the risk level of the browser-based application 208 (e.g., whether the browser-based application 208 is a security threat). In other embodiments, the security assessment may be a function of one or more of the application security information received from the security applications 218, the access control map, the design time rules, and user configurations. For example, in an embodiment, a security application 218 may identify that the browser-based application 208 includes malware in which it is a high security risk. In another embodiment, the security applications 218 may not indicate anything particularly threatening about the browser-based application 208 to the security of the computing device 102 but the runtime security analysis and enforcement module 212 may identify (e.g., from the access control map) that the browser-based application 208 is configured to routinely access a portion of the memory 112 that stores confidential information on the particular computing device 102 (e.g., personal information or private cryptographic keys). As such, despite the browser-based application 208 being "malware free," the runtime security analysis and enforcement module 212 may still identify the application as being a security threat.

In block 318, the runtime security analysis and enforcement module 212 may establish an application runtime security policy 222. In doing so, the runtime security analysis and enforcement module 212 may establish hardware access rules in block 320. In some embodiments, the hardware access rules may identify which hardware 228 or which portions of the hardware 228 of the computing device 102 authorized for access by the browser-based application 208. For example, the computing device 102 may include an in-band co-processor reserved a particular function or purpose (e.g., graphics processing, digital signal processing, cryptography, etc.). Further, as discussed above, the computing device 102 may have secure portions of the memory 112 from which the browser-based application 208 should be restricted. In each circumstance, the hardware access rules might identify that particular hardware 228 as inaccessible or otherwise unauthorized for use by the browser-based application 208. Additionally, the runtime security analysis and enforcement module 212 may establish mediation security rules in block 322. That is, the runtime security policy 222 may identify runtime procedures to be executed by the computing device 102 in the event of the occurrence of a security concern. For example, a particular function or computational operation repeated ad nauseum may, in some circumstances, raise a security concern (e.g., a potential denial of service attack). As such, the runtime security policy 222 may identify a procedure to execute to mediate or otherwise handle such an event or conflict. In another example, the runtime security policy 222 may establish procedures allowing reduced or limited access to the hardware 228 than configured or contemplated by the browser-based application 208 by, for example, filtering out unsafe application code.

As discussed above, in some embodiments, the browser-based application 208 may be received by the computing device 102 from the web server 106 dynamically, in a stream, or otherwise received over time. Accordingly, in block 324, the computing device 102 determines whether new application code has been received from the web server 106. If not, the computing device 102 (e.g., via the web security module 210) enforces the runtime security policy 222 in block 326. In doing so, in block 328, the computing device 102 may prevent unauthorized access attempts by the browser-based application 208 to hardware 228 of the computing device 102. As discussed above, in some embodiments, the runtime security analysis and enforcement module 212 and hardware management module 214 work in tandem to prevent hardware accesses that are not authorized by the runtime security policy 222 established in block 318. The computing device 102 determines whether the browser-based application 208 has been aborted in block 330. If not, the method 300 returns to block 324 in which the computing device 102 determines whether new application code has been received from the web server 106. If the computing device 102 determines in block 324 that new application code has been received from the web server 106, the method 300 returns to block 306 of FIG. 3 in which the computing device 102 provides user application launch-time access control configurations to the web security module 210.

Figure 5:
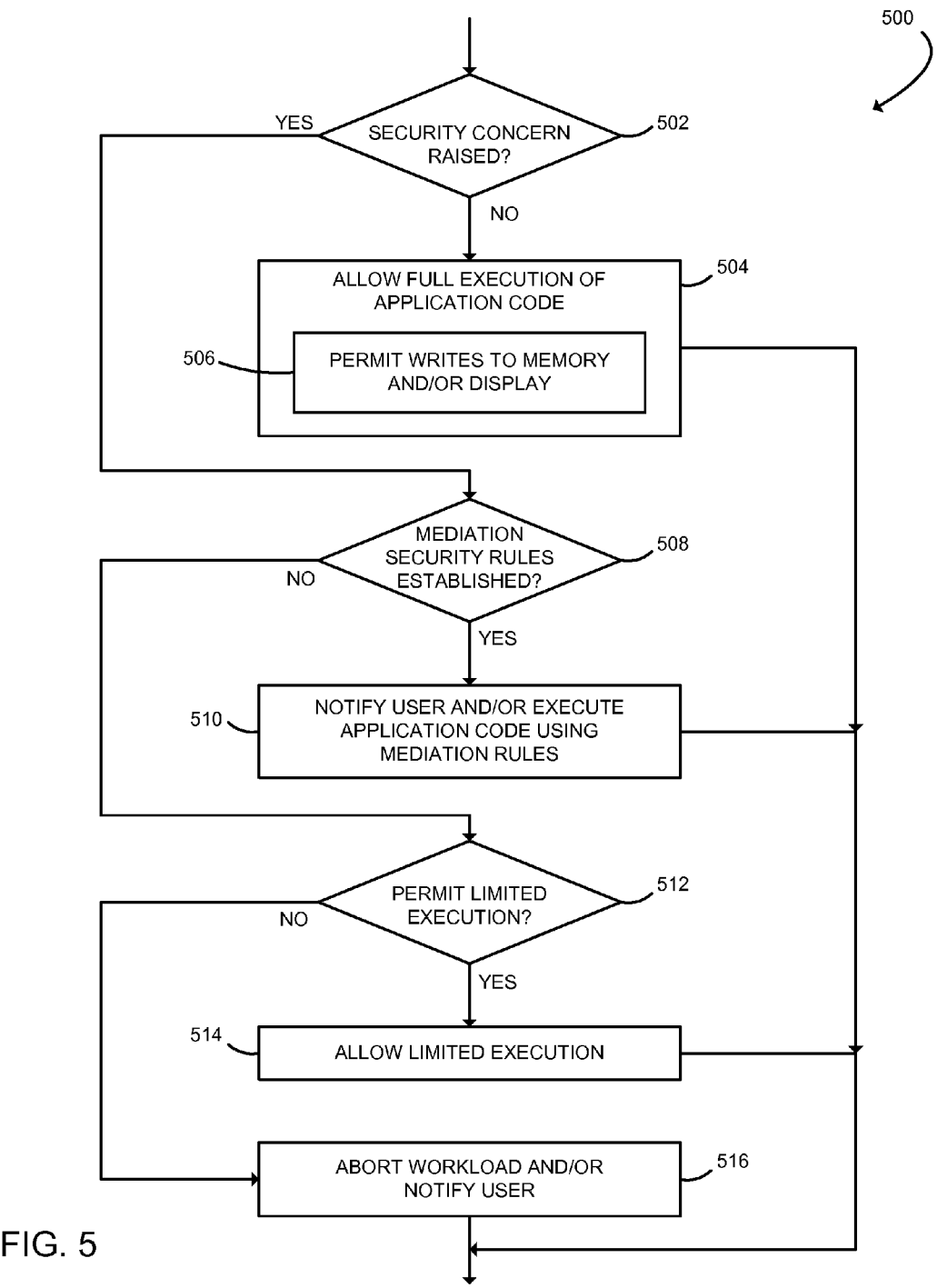
FIG. 5 is a simplified flow diagram of at least one embodiment of a method for enforcing an application runtime security policy on a computing device of the system of FIG. 1.

Referring now to FIG. 5, in use, the computing device 102 may execute a method 500 for enforcing an application runtime security policy 222. The method 500 begins with block 502 in which the computing device 102 determines whether the browser-based application 208 raised a security concern. If not, in block 504, the computing device 102 allows full or otherwise typical execution of the application code of the browser-based application 208. That is, in some embodiments, the computing device 102 permits the browser-based application 208 to access the hardware 228 (e.g., the memory 112) of the computing device 102 that the browser-based application 208 is configured to access without runtime access controls imposed in block 506.

Returning to block 502, if the computing device 102 determines that the browser-based application 208 raises a security concern, the computing device 102 determines in block 508 whether mediation security rules have been established as part of the runtime security policy 222. If mediation rules have been established, the computing device 102 may notify the user of the security concern and/or execute the application code using the established mediation security rules in block 510. For example, the computing device 102 may send an alert message to the user of the computing device using the display module 216. In some embodiments, the computing device 102 may not execute the application code unless the user has authorized its execution after having been informed of the security risk.

Returning to block 508, if mediation security rules have not been established in the runtime security policy 222, the computing device 102 may determine in block 512 whether to permit partial or limited execution of the application code. If so, the computing device 102 allows limited execution of the application code in block 514. For example, the computing device 102 may grant only partial to the hardware 228 of the computing device 102 based on the security assessment. However, if the computing device 102 determined not to permit limited execution in block 512, the computing device 102 may abort the workload and/or notify the user in block 516. For example, in an embodiment, the computing device 102 may notify the user that the workload has been aborted so that the user may determine how to respond.

EXAMPLES

Illustrative examples of the devices, systems, and methods disclosed herein are provided below. An embodiment of the devices, systems, and methods may include any one or more, and any combination of, the examples described below.

Example 1 includes a computing device for establishing client-level web application runtime control, the computing device comprising a browser to receive application code associated with a browser-based application from a web server; a browser security interface to generate machine-executable code and an access control map for the application code; and a web security module to (i) receive application security information associated with the application code from one or more security applications, (ii) perform a security assessment of the browser-based application as a function of the application security information and the access control map, (iii) establish a client-level web application runtime security policy associated with the browser-based application in response to performing the security assessment, and (iv) enforce the established client-level web application runtime security policy on the computing device, wherein the client-level web application runtime security policy identifies hardware access rules to be enforced on the computing device.

Example 2 includes the subject matter of Example 1, and wherein the browser-based application comprises a Hypertext Markup Language 5 (HTML 5) application.

Example 3 includes the subject matter of any of Examples 1 and 2, and wherein the access control map is a function of at least one of design time rules for the browser-based application and user configurations for the browser-based application.

Example 4 includes the subject matter of any of Examples 1-3, and further including a browser user interface to receive user input regarding the user configurations.

Example 5 includes the subject matter of any of Examples 1-4, and wherein the at least one of the design time rules and the user configurations identifies hardware of the computing device that the browser-based application is configured to access.

Example 6 includes the subject matter of any of Examples 1-5, and wherein the web security module is to determine whether access to the hardware is a security threat.

Example 7 includes the subject matter of any of Examples 1-6, and wherein the web security module is to receive real-time security monitoring data regarding the security of the application code from the one or more security applications.

Example 8 includes the subject matter of any of Examples 1-7, and wherein the web security module is to receive the application security information from a web security module of at least one other computing device.

Example 9 includes the subject matter of any of Examples 1-8, and wherein the web security module is to establish hardware access rules that identify which hardware of the computing device the browser-based application is authorized to access.

Example 10 includes the subject matter of any of Examples 1-9, and wherein the web security module is to establish mediation security rules to be enforced by the computing device in response to a security concern being raised.

Example 11 includes the subject matter of any of Examples 1-10, and wherein the web security module is to restrict access to hardware of the computing device as a function of the established client-level web application runtime security policy.

Example 12 includes the subject matter of any of Examples 1-11, and wherein the web security module is to restrict access to one or more memory addresses of the computing device as a function of the established client-level web application runtime security policy.

Example 13 includes the subject matter of any of Examples 1-12, and wherein the web security module is to monitor accesses by the browser-based application to hardware of the computing device.

Example 14 includes the subject matter of any of Examples 1-13, and further including a processor to execute the application code in response to the web security module identifying that no security concern has been raised.

Example 15 includes the subject matter of any of Examples 1-14, and wherein the web security module is to authorize the browser-based application for limited access to hardware of the computing device in response to (i) the web security module identifying that no security concern has been raised and (ii) the established client-level web application runtime security policy including no mediation security rules.

Example 16 includes a method for establishing client-level web application runtime control using a computing device, the method comprising receiving, with the computing device, application code associated with a browser-based application from a web server; generating, on the computing device, machine-executable code for the application code; generating, on the computing device, an access control map for the application code; receiving, with the computing device, application security information associated with the application code from one or more security applications; performing, on the computing device, a security assessment of the browser-based application as a function of the application security information and the access control map; establishing, on the computing device, a client-level web application runtime security policy associated with the browser-based application in response to performing the security assessment, the client-level web application runtime security policy identifying hardware access rules; and enforcing, on the computing device, the established client-level web application runtime security policy.

Example 17 includes the subject matter of Example 16, and wherein receiving the application code associated with the browser-based application comprises receiving Hypertext Markup Language 5 (HTML 5) application code.

Example 18 includes the subject matter of any of Examples 16 and 17, and wherein generating the access control map comprises identifying at least one of design time rules for the browser-based application and user configurations for the browser-based application.

Example 19 includes the subject matter of any of Examples 16-18, and further including receiving, with the computing device, user input regarding the user configurations.

Example 20 includes the subject matter of any of Examples 16-19, and wherein generating the access control map comprises identifying hardware of the computing device that the browser-based application is configured to access as a function of the at least one of the design time rules and the user configurations.

Example 21 includes the subject matter of any of Examples 16-20, and wherein performing the security assessment comprises determining whether access to the hardware is a security threat.

Example 22 includes the subject matter of any of Examples 16-21, and wherein receiving the application security information comprises receiving real-time security monitoring data regarding the security of the application code from the one or more security applications.

Example 23 includes the subject matter of any of Examples 16-22, and wherein receiving the application security information comprises receiving application security information from a web security module of at least one other computing device.

Example 24 includes the subject matter of any of Examples 16-23, and wherein establishing the client-level web application runtime security policy comprises establishing hardware access rules that identify which hardware of the computing device the browser-based application is authorized to access.

Example 25 includes the subject matter of any of Examples 16-24, and wherein establishing the client-level web application runtime security policy comprises establishing mediation security rules to be enforced by the computing device in response to a security concern being raised.

Example 26 includes the subject matter of any of Examples 16-25, and wherein enforcing the established client-level web application runtime security policy comprises restricting access to hardware of the computing device as a function of the hardware access rules.

Example 27 includes the subject matter of any of Examples 16-26, and wherein restricting access to hardware comprises restricting access to one or more memory addresses of the computing device.

Example 28 includes the subject matter of any of Examples 16-27, and wherein enforcing the established client-level web application runtime security policy comprises monitoring accesses by the browser-based application to hardware of the computing device.

Example 29 includes the subject matter of any of Examples 16-28, and wherein enforcing the established client-level web application runtime security policy comprises executing the application code in response to no security concern being raised.

Example 30 includes the subject matter of any of Examples 16-29, and wherein enforcing the established client-level web application runtime security policy comprises permitting the browser-based application limited access to hardware of the computing device in response to a security concern being raised and no mediation security rules having been established by the computing device.

Example 31 includes a computing device comprising a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

The invention claimed is:

1. A computing device for establishing client-level web application runtime control, the computing device comprising:
    a browser to receive application code associated with a browser-based application from a web server;
    a browser security interface to generate machine-executable code and an access control map for the application code, wherein the access control map is generated as a function of at least one of (i) design time rules for the browser-based application that identify hardware of the computing device that the browser-based application is configured to access or (ii) user configurations for the browser-based application that identify hardware of the computing device that the browser-based application is configured to access; and
    a web security module to (i) receive application security information associated with the application code from one or more security applications, (ii) perform a security assessment of the browser-based application as a function of the application security information and the access control map, (iii) establish a client-level web application runtime security policy associated with the browser-based application in response to performing the security assessment, and (iv) enforce the established client-level web application runtime security policy on the computing device,
    wherein the client-level web application runtime security policy is to identify hardware access rules to be enforced on the computing device.

2. The computing device of claim 1, wherein the browser-based application comprises a Hypertext Markup Language 5 (HTML 5) application.

3. The computing device of claim 1, further comprising a browser user interface to receive user input regarding the user configurations.

4. The computing device of claim 1, wherein the web security module is to determine whether access to the hardware is a security threat.

5. The computing device of claim 1, wherein the web security module is to receive the application security information from a web security module of at least one other computing device.

6. The computing device of claim 1, wherein the web security module is to establish hardware access rules that identify which hardware of the computing device the browser-based application is authorized to access.

7. The computing device of claim 1, wherein the web security module is to restrict access to hardware of the computing device as a function of the established client-level web application runtime security policy.

8. One or more non-transitory, machine readable storage media comprising a plurality of instructions stored thereon that, in response to being executed, result in a computing device:
   receiving application code associated with a browser-based application from a web server;
   generating machine-executable code for the application code;
   generating an access control map for the application code as a function of at least one of (i) design time rules for the browser-based application that identify hardware of the computing device that the browser-based application is configured to access or (ii) user configurations for the browser-based application that identify hardware of the computing device that the browser-based application is configured to access;
   receiving application security information associated with the application code from one or more security applications;
   performing a security assessment of the browser-based application as a function of the application security information and the access control map;
   establishing a client-level web application runtime security policy associated with the browser-based application in response to performing the security assessment, the client-level web application runtime security policy identifying hardware access rules; and
   enforcing the established client-level web application runtime security policy.

9. The one or more machine readable media of claim 8, wherein receiving the application security information comprises receiving real-time security monitoring data regarding the security of the application code from the one or more security applications.

10. The one or more machine readable media of claim 8, wherein establishing the client-level web application runtime security policy comprises establishing hardware access rules that identify which hardware of the computing device the browser-based application is authorized to access.

11. The one or more machine readable media of claim 8, wherein establishing the client-level web application runtime security policy comprises establishing mediation security rules to be enforced by the computing device in response to a security concern being raised.

12. The one or more machine readable media of claim 8, wherein enforcing the established client-level web application runtime security policy comprises restricting access to one or more memory addresses of the computing device.

13. The one or more machine readable media of claim 8, wherein enforcing the established client-level web application runtime security policy comprises monitoring accesses by the browser-based application to hardware of the computing device.

14. The one or more machine readable media of claim 8, wherein enforcing the established client-level web application runtime security policy comprises executing the application code in response to no security concern being raised.

15. The one or more machine readable media of claim 8, wherein enforcing the established client-level web application runtime security policy comprises permitting the browser-based application limited access to hardware of the computing device in response to a security concern being raised and no mediation security rules having been established by the computing device.

16. A method for establishing client-level web application runtime control using a computing device, the method comprising:
   receiving, with the computing device, application code associated with a browser-based application from a web server;
   generating, on the computing device, machine-executable code for the application code;
   generating, on the computing device, an access control map for the application code as a function of at least one of (i) design time rules for the browser-based application that identify hardware of the computing device that the browser-based application is configured to access or (ii) user configurations for the browser-based application that identify hardware of the computing device that the browser-based application is configured to access;
   receiving, with the computing device, application security information associated with the application code from one or more security applications;
   performing, on the computing device, a security assessment of the browser-based application as a function of the application security information and the access control map;
   establishing, on the computing device, a client-level web application runtime security policy associated with the browser-based application in response to performing the security assessment, the client-level web application runtime security policy identifying hardware access rules; and
   enforcing, on the computing device, the established client-level web application runtime security policy.

17. The method of claim 16, wherein receiving the application code associated with the browser-based application comprises receiving Hypertext Markup Language 5 (HTML 5) application code.

18. The method of claim 16, wherein receiving the application security information comprises receiving application security information from at least one of a local security applications and a web security module of another computing device.

19. The method of claim 16, wherein establishing the client-level web application runtime security policy comprises establishing hardware access rules that identify which hardware of the computing device the browser-based application is authorized to access.

20. The method of claim 19, wherein enforcing the established client-level web application runtime security policy comprises restricting access to hardware of the computing device as a function of the hardware access rules.

21. The method of claim 16, wherein enforcing the established client-level web application runtime security policy comprises monitoring accesses by the browser-based application to hardware of the computing device.

* * * * *